(12) United States Patent     (10) Patent No.:     US 12,654,710 B2
Sato                              (45) Date of Patent:     *Jun. 16, 2026

(54) ROAD SURFACE FRICTION COEFFICIENT CALCULATION APPARATUS, VEHICLE, AND ROAD SURFACE FRICTION COEFFICIENT CALCULATION METHOD

(71) Applicant: SUBARU CORPORATION, Tokyo (JP)

(72) Inventor: Fumiya Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 116 days.

This patent is subject to a terminal disclaimer.

(21) Appl. No.: 18/741,318

(22) Filed: Jun. 12, 2024

(65) Prior Publication Data

US 2024/0326823 A1     Oct. 3, 2024

Related U.S. Application Data

(63) Continuation of application No. PCT/JP2023/011210, filed on Mar. 22, 2023.

(51) Int. Cl.
*B60W 40/068*     (2012.01)

(52) U.S. Cl.
CPC ........ *B60W 40/068* (2013.01); *B60W 2520/10* (2013.01); *B60W 2520/125* (2013.01); *B60W 2520/14* (2013.01)

(58) Field of Classification Search
CPC ........... B60W 40/068; B60W 2520/10; B60W 2520/125; B60W 2520/14
See application file for complete search history.

(56) References Cited

U.S. PATENT DOCUMENTS

| | | | |
|---|---|---|---|
| 2010/0235061 A1* | 9/2010 | Fujiwara | B60W 10/06 |
| | | | 477/120 |
| 2017/0066450 A1* | 3/2017 | Ko | G05D 1/0214 |
| 2023/0073598 A1 | 3/2023 | Sato | |

FOREIGN PATENT DOCUMENTS

| | | |
|---|---|---|
| JP | 2000-318634 A | 11/2000 |
| JP | 2002-340863 A | 11/2002 |

(Continued)

OTHER PUBLICATIONS

International Searh Report issued in International Patent Application No. PCT/JP2023/011210 dated Apr. 25, 2023.

(Continued)

*Primary Examiner* — Sihar A Karwan
(74) *Attorney, Agent, or Firm* — TROUTMAN PEPPER LOCKE LLP

(57) ABSTRACT

A road surface friction coefficient calculation apparatus to be applied to a vehicle includes an obtainer and a determiner. The obtainer is configured to acquire n pieces of sensor data periodically obtained by a predetermined sensor during a predetermined period. The determiner is configured to determine a road surface condition in front of the vehicle by making a majority decision on road surface conditions, based on the n pieces of sensor data acquired by the obtainer. The determiner is configured to set a different road surface friction coefficient for each of the road surface conditions, and determine a road surface friction coefficient in front of the vehicle, based on the road surface friction coefficient corresponding to the road surface condition determined by the majority decision.

15 Claims, 4 Drawing Sheets

21

| ROAD SURFACE CONDITION | THRESHOLD | ROAD SURFACE FRICTION COEFFICIENT | COUNT VALUE |
|---|---|---|---|
| DRY | th1 | 0.82 | |
| WET | th2 | 0.58 | |
| SNOW | th3 | 0.51 | |
| ICE | th4 | 0.17 | | th1>th2>th3>th4

(56)        References Cited

FOREIGN PATENT DOCUMENTS

| JP | 2006-046936 A | 2/2006 |
| JP | 2010-164521 A | 7/2010 |
| JP | 2011-51519 A | 3/2011 |
| JP | 2011-183966 A | 9/2011 |
| JP | 2021-018084 A | 2/2021 |
| JP | 2021-182381 A | 11/2021 |
| JP | 2023-039044 A | 3/2023 |

OTHER PUBLICATIONS

Reasons for Refusal issued in Japanese Patent Application No. 2024-524425 dated Jan. 21, 2025, with machine translation.

* cited by examiner

| ROAD SURFACE CONDITION | THRESH-OLD | ROAD SURFACE FRICTION COEFFICIENT | COUNT VALUE |
|---|---|---|---|
| DRY | th1 | 0.66~1.00 | |
| WET | th2 | 0.44~0.70 | |
| SNOW | th3 | 0.34~0.61 | |
| ICE | th4 | 0.03~0.29 | | th1>th2>th3>th4

| ROAD SURFACE CONDITION | THRESH-OLD | ROAD SURFACE FRICTION COEFFICIENT | COUNT VALUE |
|---|---|---|---|
| DRY | th1 | 0.82 | |
| WET | th2 | 0.58 | |
| SNOW | th3 | 0.51 | |
| ICE | th4 | 0.17 | | th1>th2>th3>th4

| ROAD SURFACE CONDITION | THRESH-OLD | ROAD SURFACE FRICTION COEFFICIENT | COUNT VALUE |
|---|---|---|---|
| DRY | th1 | 0.71, 0.94 | |
| WET | th2 | 0.51, 0.65 | |
| SNOW | th3 | 0.40, 0.54 | |
| ICE | th4 | 0.12, 0.25 | | th1>th2>th3>th4

| ROAD SURFACE CONDITION | THRESH-OLD | ROAD SURFACE FRICTION COEFFICIENT | COUNT VALUE |
|---|---|---|---|
| DRY | th1 | $aX^2+bX+c$ | |
| WET | th2 | $dX^2+eX+f$ | |
| SNOW | th3 | $gX^2+hX+i$ | |
| ICE | th4 | $jX^2+kX+m$ | | th1>th2>th3>th4

ROAD SURFACE FRICTION COEFFICIENT CALCULATION APPARATUS, VEHICLE, AND ROAD SURFACE FRICTION COEFFICIENT CALCULATION METHOD

CROSS-REFERENCE TO RELATED APPLICATIONS

This application is continuation of International Application No. PCT/JP2023/011210, filed on Mar. 22, 2023, the entire contents of which are hereby incorporated by reference.

BACKGROUND

The disclosure relates to a road surface friction coefficient calculation apparatus, a vehicle, and a road surface friction coefficient calculation method.

To improve safety of driving, a road surface state in an advancing direction of a vehicle is to be accurately determined in advance. In determining the road surface state, for example, a road surface friction coefficient may be used. For example, Japanese Unexamined Patent Application Publication Nos. 2006-046936 and 2010-164521 disclose a technique to estimate the road surface friction coefficient in a non-contact manner.

SUMMARY

An aspect of the disclosure provides a road surface friction coefficient calculation apparatus to be applied to a vehicle. The road surface friction coefficient calculation apparatus includes an obtainer and a determiner. The obtainer is configured to acquire n pieces of sensor data periodically obtained by a predetermined sensor during a predetermined period. The determiner is configured to determine a road surface condition in front of the vehicle by making a majority decision on road surface conditions, based on the n pieces of sensor data acquired by the obtainer. The determiner is configured to set a different road surface friction coefficient for each of the road surface conditions, and determine a road surface friction coefficient in front of the vehicle, based on the road surface friction coefficient corresponding to the road surface condition determined by the majority decision.

An aspect of the disclosure provides a road surface friction coefficient calculation method including: setting a different road surface friction coefficient for each of road surface conditions; making a majority decision on the road surface conditions, based on n pieces of sensor data periodically obtained by a predetermined sensor during a predetermined period; and determining a road surface friction coefficient in front of a vehicle, based on the road surface friction coefficient corresponding to the road surface condition determined by the majority decision.

An aspect of the disclosure provides a road surface friction coefficient calculation apparatus to be applied to a vehicle. The road surface friction coefficient calculation apparatus includes circuitry configured to: acquire n pieces of sensor data periodically obtained by a predetermined sensor during a predetermined period; and determine a road surface condition in front of the vehicle by making a majority decision on road surface conditions, based on the acquired n pieces of sensor data. The circuitry is configured to set a different road surface friction coefficient for each of the road surface conditions, and determine a road surface friction coefficient in front of the vehicle, based on the road surface friction coefficient corresponding to the road surface condition determined by the majority decision.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIGS. 4A, 4B, and 4C are tables illustrating modification examples of the data set of FIG. 2.

DETAILED DESCRIPTION

Figures 1, 2:
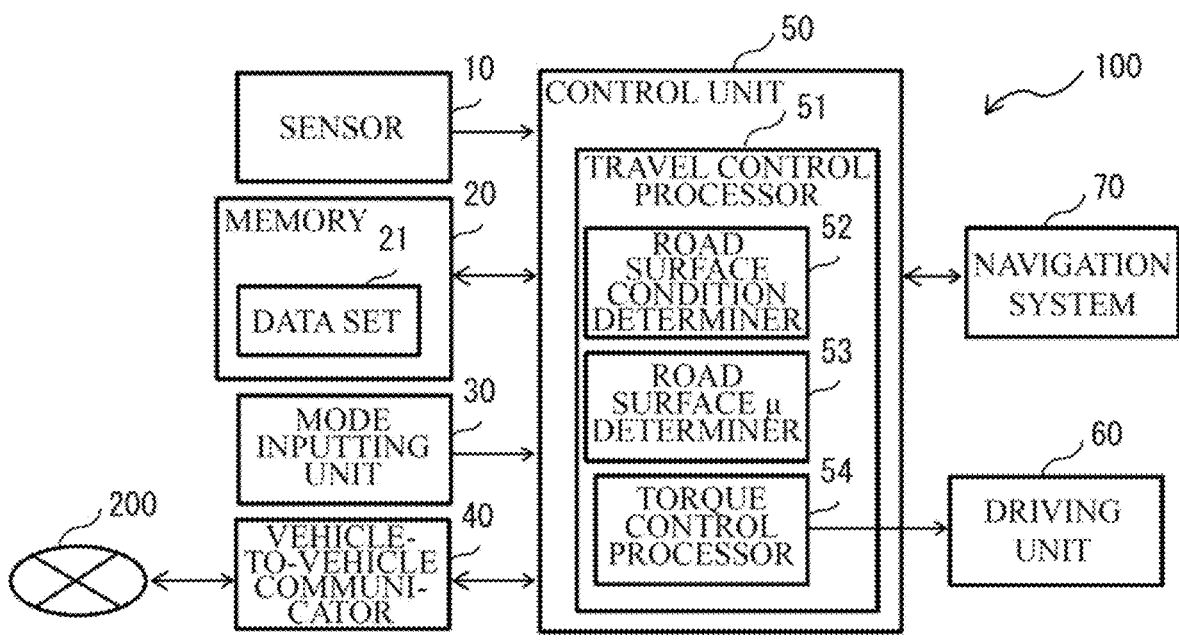
FIG. 1 is a diagram illustrating a schematic configuration example of a vehicle including a road surface friction coefficient calculation apparatus according to one example embodiment of the disclosure.
FIG. 2 is a table for describing a data set of FIG. 1.

In estimating a road surface friction coefficient, an error may possibly occur due to an influence of noise included in a detection signal of a sensor.

It is desirable to provide a road surface friction coefficient calculation apparatus, a vehicle, and a road surface friction coefficient calculation method that make it possible to estimate a road surface friction coefficient that is robust against a disturbance.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 illustrates a schematic configuration example of a vehicle 100 including a road surface friction coefficient calculation apparatus according to an example embodiment of the disclosure. As illustrated in FIG. 1, the vehicle 100 may include, for example, a sensor 10, a memory 20, a mode inputting unit 30, a vehicle-to-vehicle communicator 40, a control unit 50, a driving unit 60, and a navigation system 70. In one embodiment, the vehicle 100 may serve as a "vehicle" and a "front vehicle". In one embodiment, the control unit 50 may serve as a "road surface friction coefficient calculation apparatus".

The sensor 10 may be various sensors mounted on the vehicle 100. The sensor 10 may include, for example, a state quantity sensor and a light-receiving sensor. In one embodiment, the sensor 10 may serve as a "predetermined sensor".

The state quantity sensor may be configured to detect a vehicle state quantity that is data indicating a state of the vehicle 100. The state quantity sensor may be configured to detect, as the vehicle state quantity, a speed of the vehicle 100 (a vehicle speed), and a lateral acceleration rate and a yaw acceleration rate that are applied to the vehicle 100, for example. The state quantity sensor may be configured to output data (vehicle state quantity data) regarding the detected vehicle state quantity to the control unit 50. The speed of the vehicle 100 (the vehicle speed) may be detectable by a vehicle speed sensor. The lateral acceleration rate and the yaw acceleration rate may be detectable by an acceleration sensor.

The light-receiving sensor may include, for example, a light source (for example, a light-emitting diode or a semiconductor laser) that emits near-infrared light including three wavelengths, and a light receiver (for example, a photodiode) that receives near-infrared light including three wavelengths. Near-infrared light including three wavelengths may be emitted from a light-emitting diode or a semiconductor laser toward a road surface in front of the vehicle 100. The light receiver may be configured to receive thus obtained reflected light from the road surface in front of the vehicle 100. For example, the light-receiving sensor may be configured to output, to the control unit 50, data (received light data) corresponding to an amount of the reflected light detected by the light receiver.

Here, the near-infrared light including three wavelengths may include, for example, light of a first wavelength (for example, 980 nm) that is relatively less affected by moisture, light of a second wavelength (1370 nm to 1450 nm) that is hard to be absorbed by ice and easily absorbed by water (that is, an influence of moisture is great and an influence of ice is small), and light of a third wavelength (1470 nm to 1550 nm) that is easily absorbed by ice and hard to be absorbed by water (that is, the influence of moisture is small and the influence of ice is great).

The light-receiving sensor may be a non-contact sensor. The light-receiving sensor may be configured to periodically acquire n pieces of sensor data (n pieces of received light data).

The memory 20 may include, for example, a known updatable recording medium such as a solid-state drive (SSD), a hard disk drive (HDD), a USB flash drive, or a storage device. The memory 20 may store, for example, a data set 21 as illustrated in FIG. 1. In one embodiment, the memory 20 may serve as a "memory".

For example, as illustrated in FIG. 2, the data set 21 may include a road surface friction coefficient and a threshold that are associated with each road surface condition. In the data set 21, the road surface conditions may include, for example, four conditions (DRY, WET, SNOW, and ICE) as illustrated in FIG. 2. The number of the road surface conditions and what conditions are included as the road surface conditions are not limited to the above.

In the data set 21, the road surface friction coefficient may have an upper limit value and a lower limit value for each road surface condition, for example, as illustrated in FIG. 2. For example, as illustrated in FIG. 2, a range may be set for each road surface condition as the road surface friction coefficient. In the data set 21, each road surface condition may have a different road surface friction coefficient (a different road surface friction coefficient range).

Further, in the data set 21, each road surface condition may be associated with a count value. Each of the n pieces of sensor data inputted from the sensor 10 to the control unit 50 during a predetermined period may be assigned to one of the road surface conditions defined in the data set 21. For example, a numerical range of the sensor data may be set for each road surface condition, and each of the n pieces of sensor data may be assigned to the road surface condition corresponding to the relevant numerical range. The number of pieces of sensor data assigned to each road surface condition may be the count value. The n pieces of sensor data may be, for example, data obtainable from the light-receiving sensor of the sensor 10 during the predetermined period, and may be parameters resulting from the road surface friction coefficient.

In the data set 21, the threshold may be a value to be compared with the count value. When there is one road surface condition in which the count value is greater than or equal to the threshold, it may be estimated that this road surface condition is a current road surface condition in front of the vehicle 100. When there are two or more road surface conditions in which the count value is greater than or equal to the threshold, it may be estimated that the road surface condition determined in accordance with a predetermined determination rule is the current road surface condition in front of the vehicle 100. When there is no road surface condition in which the count value is greater than or equal to the threshold, it may be estimated that the road surface condition determined in accordance with a predetermined determination rule is the current road surface condition in front of the vehicle 100. The count value may be reset at every predetermined cycle. In the data set 21, each threshold may be set to a relatively small value as the corresponding road surface friction coefficient becomes relatively small.

The mode inputting unit 30 may be an interface that is configured to accept a setting of a traveling mode from a user. The traveling mode may include, for example, a city traveling mode, a freeway traveling mode, a sport traveling mode, a rainy weather traveling mode, and a snow road traveling mode. The mode inputting unit 30 may include, for example, a touch panel and a voice input device. The mode inputting unit 30 may be configured to output, to the control unit 50, data regarding the traveling mode inputted by the user, for example.

The vehicle-to-vehicle communicator 40 may be an interface that is configured to communicate with a vehicle (hereinafter, also referred to as "another vehicle") traveling around the vehicle 100. The vehicle-to-vehicle communicator 40 of the own vehicle (the vehicle 100) and the vehicle-to-vehicle communicator 40 of the other vehicle (the vehicle 100) may be coupled to a network 200. The network 200 may be, for example, an in-vehicle communication network compliant with any standard such as a controller area network (CAN), a local interconnect network (LIN), a local area network (LAN), or FlexRay (registered trademark). The vehicle-to-vehicle communicator 40 may include, for example, a receiver and a transmitter. The receiver may be configured to receive sensor data acquired by a sensor (a device corresponding to the sensor 10) of the other vehicle. The transmitter may be configured to transmit the sensor data acquired by the sensor 10 to the other vehicle. In one embodiment, the vehicle-to-vehicle communicator 40 may serve as a "communicator".

The control unit 50 may include, for example, a central processing unit (CPU) and may be configured to execute programs stored in the memory 20, for example. The control unit 50 may be configured to control the entire vehicle 100. The control unit 50 may be configured to execute series of procedures described in the programs, for example.

The control unit 50 may include, for example, a travel control processor 51 as illustrated in FIG. 1. The travel control processor 51 may be configured to control traveling of the vehicle 100 (for example, a torque of the driving unit 60). The travel control processor 51 may include, for example, a torque control processor 54 as illustrated in FIG. 1. In one embodiment, the travel control processor 51 may serve as a "control processor".

The torque control processor 54 may be configured to derive a requested torque corresponding to an acceleration rate request. The acceleration rate request may refer to depression of an accelerator pedal or a variation in a depression amount of the accelerator pedal. The acceleration rate request may be made by a driver who drives the vehicle 100 during manual driving or by the travel control processor 51 during automated driving. The torque control processor 54 may be configured to derive a torque amount (the requested torque) to be generated by the driving unit 60, based on accelerator position data obtained from an accelerator position sensor.

The torque control processor 54 may be configured to control the torque of the driving unit 60, based on the requested torque. The driving unit 60 may be configured to drive steered wheels of the vehicle 100 and may drive the steered wheels of the vehicle 100 in accordance with the requested torque. The driving unit 60 may include, for example, one or both of an engine and an electric motor. For example, the driving unit 60 may be configured to drive one or both of the engine and the electric motor in accordance with control from the control unit 50.

The navigation system 70 may be a known navigation system that sets a travel route to a destination inputted by the driver and notifies the driver of the travel route. The navigation system 70 may include a global positioning system (GPS) sensor and map data. The navigation system 70 may receive satellite signals from GPS satellites through the GPS sensor and acquire position data of the vehicle 100 on the map data. The navigation system 70 may include a display panel that displays the acquired position data in a superimposed manner on the map data. Instead of the GPS sensor, the navigation system 70 may include an antenna that receives satellite signals from another satellite system that identifies a position of the vehicle 100.

The travel control processor 51 may include, for example, a road surface condition determiner 52 and a road surface μ determiner 53 as illustrated in FIG. 1. In one embodiment, the road surface condition determiner 52 may serve as an "obtainer". In one embodiment, the road surface condition determiner 52 and the road surface u determiner 53 may serve as a "determiner".

The road surface condition determiner 52 is configured to acquire the n pieces of sensor data (for example, the n pieces of received light data) periodically obtained by the sensor 10 during the predetermined period. The road surface condition determiner 52 is configured to determine the road surface condition in front of the vehicle 100 by making a majority decision on multiple road surface conditions in the data set 21, based on the acquired n pieces of sensor data (for example, the acquired n pieces of received light data). The road surface condition determiner 52 may be configured to set a range, as the road surface friction coefficient, for each of the road surface conditions in the data set 21. The road surface condition determiner 52 may be configured to set the road surface friction coefficient and the threshold for each of the road surface conditions in the data set 21. The road surface condition determiner 52 may set each of the thresholds to a relatively small value as the corresponding road surface friction coefficient becomes relatively small. The road surface condition determiner 52 may make a majority decision using the thresholds as determination criteria.

When the count value is greater than or equal to the threshold in any of the road surface conditions as a result of the majority decision, the road surface condition determiner 52 may be configured to set the road surface condition, in which the count value is greater than or equal to the threshold, as the road surface condition in front of the vehicle 100. The road surface condition determiner 52 may be configured to make the majority decision by determining to which of the road surface conditions the road surface condition in front of the vehicle 100 corresponds, based on the sensor data (for example, the received light data), and incrementing the count value corresponding to the determined road surface condition.

The road surface condition determiner 52 may assign each of the n pieces of sensor data (for example, the n pieces of received light data) inputted from the sensor 10 to the control unit 50 during the predetermined period to one of the road surface conditions defined in the data set 21. The road surface condition determiner 52 may set, for example, the numerical range of the sensor data (for example, the numerical range of the received light data) for each road surface condition. The road surface condition determiner 52 may assign each of the n pieces of sensor data to the road surface condition corresponding to the relevant numerical range. The number of pieces of sensor data assigned to each road surface condition may be the count value.

As a result of the majority decision, when the count value is not greater than or equal to the threshold in any of the road surface conditions, the road surface condition determiner 52 may consider the road surface condition having a smallest road surface friction coefficient out of the road surface conditions as the road surface condition in front of the vehicle 100. As a result of the majority decision, when the count value is not greater than or equal to the threshold in any of the road surface conditions, the road surface condition determiner 52 may shift the process to the road surface u determiner 53 without determining the road surface condition. As a result of the majority decision, when the count value is greater than or equal to the threshold in two or more road surface conditions out of the multiple road surface conditions, the road surface condition determiner 52 may shift the process to the road surface u determiner 53 without determining the road surface condition.

The road surface μ determiner 53 may be configured to determine the road surface friction coefficient in front of the vehicle 100 based on, for example, the road surface friction coefficient corresponding to the road surface condition determined by the majority decision. The road surface μ determiner 53 may determine the road surface friction coefficient in front of the vehicle 100, based on, for example, the road surface friction coefficient range corresponding to the road surface condition determined by the majority decision. The road surface μ determiner 53 may, for example, set a median of the road surface friction coefficient corresponding to the road surface condition determined by the majority decision as the road surface friction coefficient in front of the vehicle 100.

The road surface μ determiner 53 may perform, for example, the following process when the count value is not greater than or equal to the threshold in any of the road surface conditions as a result of the majority decision. The road surface μ determiner 53 may determine the road surface friction coefficient in front of the vehicle 100, based on, for example, the road surface friction coefficient (for example, the road surface friction coefficient range) corresponding to the road surface condition having the smallest road surface friction coefficient out of the road surface conditions. The road surface μ determiner 53 may, for example, perform weighting of the road surface friction coefficient (for example, the road surface friction coefficient range) of each road surface condition in accordance with the count value. The road surface μ determiner 53 may determine the road surface friction coefficient in front of the vehicle 100, based on the weighted road surface friction coefficient (for example, the weighted road surface friction coefficient range). The road surface μ determiner 53 may, for example, perform weighting (DRY<WET<SNOW<ICE) of the road surface friction coefficient (for example, the road surface friction coefficient range) of each road surface condition in accordance with a magnitude of the road surface friction coefficient (for example, the road surface friction coefficient range). The road surface μ determiner 53 may determine the road surface friction coefficient in front of the vehicle 100, based on the weighted road surface friction coefficient (for example, the weighted road surface friction coefficient range).

The road surface μ determiner 53 may perform, for example, the following process when the count value is greater than or equal to the threshold in two or more road surface conditions out of the multiple road surface conditions as a result of the majority decision. The road surface μ determiner 53 may determine the road surface friction coefficient in front of the vehicle 100, based on, for example, the road surface friction coefficients (for example, the road surface friction coefficient ranges) of two or more road surface conditions in which the count value is greater than or equal to the threshold. The road surface μ determiner 53 may, for example, perform weighting of the road surface friction coefficient (for example, the road surface friction coefficient range) of each road surface condition in which the count value is greater than or equal to the threshold in accordance with the count value. The road surface μ determiner 53 may determine the road surface friction coefficient in front of the vehicle 100, based on the weighted road surface friction coefficient (for example, the weighted road surface friction coefficient range). For example, the road surface μ determiner 53 may set, as the road surface friction coefficient in front of the vehicle 100, a median of medians of the road surface friction coefficient ranges of the road surface conditions in which the count value is greater than or equal to the threshold.

Figure 3:
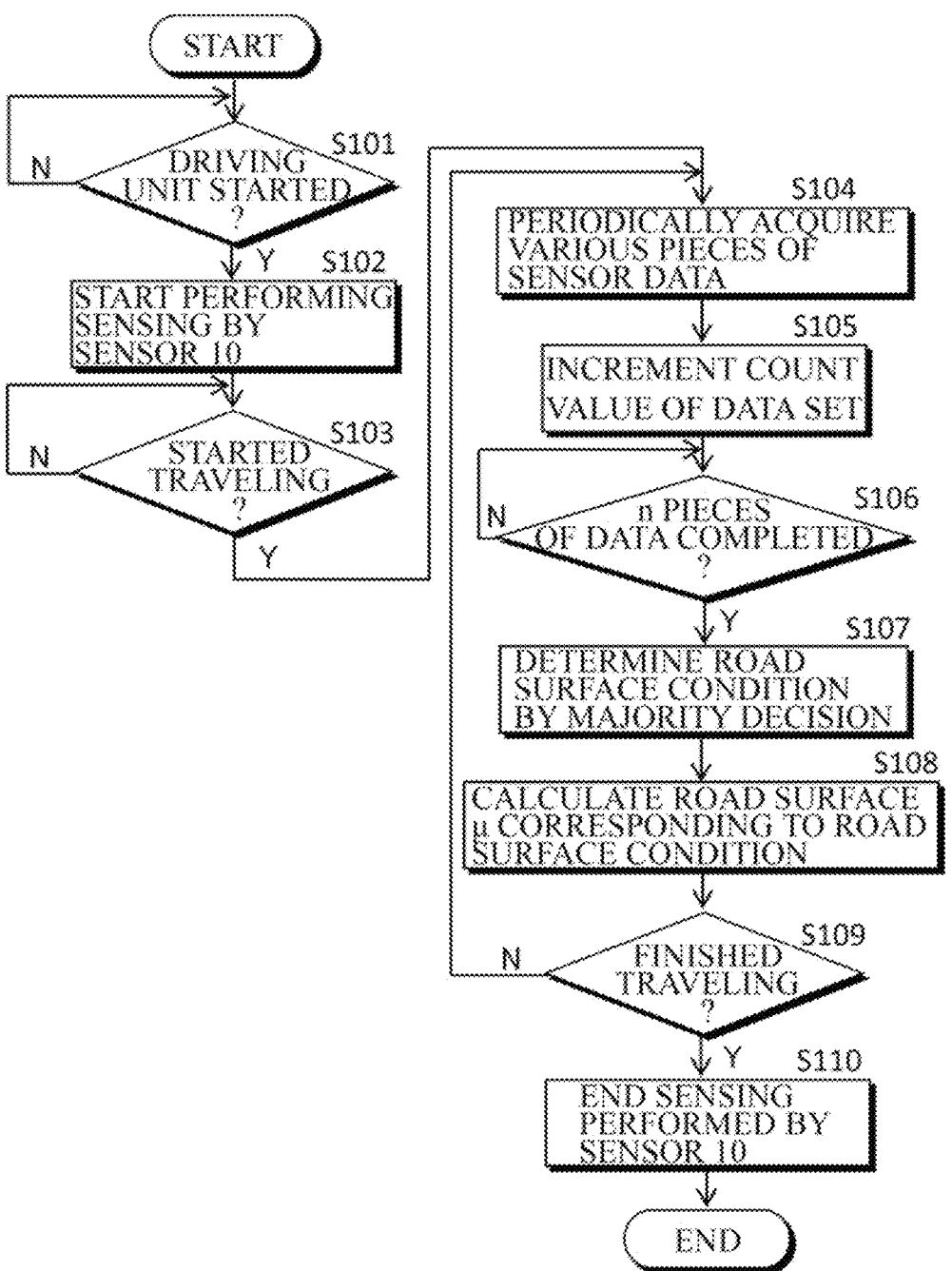
FIG. 3 is a flowchart for describing an example of a road surface friction coefficient calculation procedure performed in the vehicle of FIG. 1.

Next, a road surface friction coefficient calculation procedure performed in the vehicle 100 according to the example embodiment of the disclosure will be described. FIG. 3 illustrates an example of the road surface friction coefficient calculation procedure performed in the vehicle 100.

First, the control unit 50 may determine whether the driving unit 60 has been started (step S101). As a result, when it is determined that the driving unit 60 has been started (step S101; Y), the control unit 50 may start performing sensing by the sensor 10 (step S102). The control unit 50 may determine whether the vehicle 100 has started traveling (step S103). As a result, when it is determined that the vehicle 100 has started traveling (step S103; Y), the control unit 50 may periodically acquire various pieces of sensor data from the sensor 10 (step S104).

The control unit 50 may determine to which of the road surface conditions the road surface condition in front of the vehicle 100 corresponds, based on the sensor data (for example, the received light data), and increment the count value corresponding to the determined road surface condition (step S105). The control unit 50 may perform the above process for all the n pieces of sensor data (for example, the n pieces of received light data). When the processes for the n pieces of sensor data (for example, the n pieces of received light data) are completed (step S106; Y), the control unit 50 may make a majority decision using the thresholds, and thereby determine the road surface condition (step S107).

As a result of the majority decision, when the count value is greater than or equal to the threshold in any of the road surface conditions, the control unit 50 may set the road surface condition in which the count value is greater than or equal to the threshold as the road surface condition in front of the vehicle 100. For example, assume that n is 10, the threshold of DRY is 9, the threshold of WET is 7, the threshold of SNOW is 5, and the threshold of ICE is 3. At this time, when the count value of DRY is 9, the count value of WET is 0, the count value of SNOW is 1, and the count value of ICE is 0, the control unit 50 may determine that the road surface condition is DRY. When the count value of DRY is 0, the count value of WET is 5, the count value of SNOW is 1, and the count value of ICE is 4, the control unit 50 may determine that the road surface condition is ICE.

Note that, as a result of the majority decision, when the count value is not greater than or equal to the threshold in any of the road surface conditions, the control unit 50 may consider that the road surface condition having the smallest road surface friction coefficient out of the road surface conditions as the road surface condition in front of the vehicle 100. For example, assume that n is 10, the threshold of DRY is 9, the threshold of WET is 7, the threshold of SNOW is 5, and the threshold of ICE is 3. At this time, when the count value of DRY is 0, the count value of WET is 0, the count value of SNOW is 3, and the count value of ICE is 2, the control unit 50 may determine that the road surface condition is ICE.

When the count value is not greater than or equal to the threshold in any of the road surface conditions as a result of the majority decision, the control unit 50 may cause the process to shift to step S108 without immediately determining the road surface condition. For example, assume that n is 10, the threshold of DRY is 9, the threshold of WET is 7, the threshold of SNOW is 5, and the threshold of ICE is 3. In this case, when the count value of DRY is 6, the count value of WET is 3, the count value of SNOW is 0, and the count value of ICE is 0, the control unit 50 may cause the process to shift to step S108 without immediately determining the road surface condition.

When the count value is greater than or equal to the threshold in two or more road surface conditions out of the multiple road surface conditions as a result of the majority decision, the control unit 50 may cause the process to shift to step S108 without immediately determining the road surface condition. For example, assume that n is 10, the threshold of DRY is 9, the threshold of WET is 7, the threshold of SNOW is 5, and the threshold of ICE is 3. In this case, when the count value of DRY is 0, the count value of WET is 4, the count value of SNOW is 6, and the count value of ICE is 3, the control unit 50 may cause the process to shift to step S108 without immediately determining the road surface condition.

The control unit 50 may read, from the memory 20, the road surface friction coefficient (for example, the road surface friction coefficient range) corresponding to the road surface condition determined by the majority decision. The control unit 50 may determine the road surface friction coefficient in front of the vehicle 100, based on the read road surface friction coefficient (for example, the read road surface friction coefficient range) (step S108). For example, when one road surface condition is selected as a result of the majority decision, the control unit 50 may determine the road surface friction coefficient in front of the vehicle 100, based on the road surface friction coefficient (for example, the road surface friction coefficient range) corresponding to the selected road surface condition. For example, when one road surface condition is selected as a result of the majority decision, the control unit 50 may set a median of the road surface friction coefficient corresponding to the selected road surface condition as the road surface friction coefficient in front of the vehicle 100.

The control unit 50 may perform, for example, the following process when the count value is not greater than or equal to the threshold in any of the road surface conditions as a result of the majority decision. The control unit 50 may determine the road surface friction coefficient in front of the vehicle 100, based on, for example, the road surface friction coefficient (for example, the road surface friction coefficient range) corresponding to the road surface condition having the smallest road surface friction coefficient out of the road surface conditions. The control unit 50 may, for example, perform weighting of the road surface friction coefficient (for example, the road surface friction coefficient range) of each road surface condition in accordance with the count value. The control unit 50 may determine the road surface friction coefficient in front of the vehicle 100, based on the weighted road surface friction coefficient (for example, the weighted road surface friction coefficient range). The control unit 50 may, for example, perform weighting (DRY<WET<SNOW<ICE) of the road surface friction coefficient (for example, the road surface friction coefficient range) of each road surface condition in accordance with the magnitude of the road surface friction coefficient (for example, the road surface friction coefficient range). The control unit 50 may determine the road surface friction coefficient in front of the vehicle 100, based on the weighted road surface friction coefficient (for example, the weighted road surface friction coefficient range).

The control unit 50 may perform, for example, the following process when the count value is greater than or equal to the threshold in two or more road surface conditions out of the multiple road surface conditions as a result of the majority decision. The control unit 50 may determine the road surface friction coefficient in front of the vehicle 100, based on, for example, the road surface friction coefficients (for example, the road surface friction coefficient ranges) of two or more road surface conditions in which the count value is greater than or equal to the threshold. The control unit 50 may, for example, perform weighting of the road surface friction coefficient (for example, the road surface friction coefficient range) of each road surface condition in which the count value is greater than or equal to the threshold in accordance with the count value. The control unit 50 may determine the road surface friction coefficient in front of the vehicle 100, based on the weighted road surface friction coefficient (for example, the weighted road surface friction coefficient range). For example, the control unit 50 may set, as the road surface friction coefficient in front of the vehicle 100, a median of medians of the road surface friction coefficient ranges of the road surface conditions in which the count value is greater than or equal to the threshold.

The control unit 50 may determine whether the vehicle 100 has finished traveling (step S109). As a result, when it is determined that the vehicle 100 has finished traveling (step S109; Y), the control unit 50 may end the sensing performed by the sensor 10 (step S110). In this way, calculation of the road surface friction coefficient may be performed in the vehicle 100.

Next, example effects of the vehicle 100 according to at least one example embodiment of the disclosure will be described.

In the example embodiment, the road surface condition in front of the vehicle 100 is determined by making a majority decision on the road surface conditions, based on the n pieces of sensor data (for example, the n pieces of received light data) periodically obtained by the sensor 10 during the predetermined period. Further, a different road surface friction coefficient is set for each of the road surface conditions, and the road surface friction coefficient in front of the vehicle 100 is determined based on the road surface friction coefficient corresponding to the road surface condition determined by the majority decision. This helps to estimate the road surface friction coefficient that is robust against a disturbance even when noise is included in a detection signal of the sensor compared with a case where the road surface friction coefficient is estimated directly from the sensor data.

In some embodiments, a range may be set for each of the road surface conditions as the road surface friction coefficient, and the road surface friction coefficient in front of the vehicle 100 may be determined based on the range of the road surface friction coefficient corresponding to the road surface condition determined by the majority decision. This helps to estimate the road surface friction coefficient that is robust against a disturbance even when noise is included in the detection signal of the sensor compared with a case where the road surface friction coefficient is estimated directly from the sensor data.

In some embodiments, the road surface friction coefficient and the threshold may be set for each of the road surface conditions. Each of the thresholds may be set to a relatively small value as the corresponding road surface friction coefficient becomes relatively small. A majority decision may be made using the thresholds as determination criteria. This helps to estimate the road surface friction coefficient that is robust against a disturbance even when noise is included in the detection signal of the sensor compared with a case where the road surface friction coefficient is estimated directly from the sensor data.

In some embodiments, as a result of the majority decision, when the count value is not greater than or equal to the threshold in any of the road surface conditions, the road surface friction coefficient in front of the vehicle 100 may be determined based on the road surface friction coefficient corresponding to the road surface condition having the smallest road surface friction coefficient out of the road surface conditions. This helps to avoid vehicle control that induces slipping.

In some embodiments, as a result of the majority decision, when the count value is not greater than or equal to the threshold in any of the road surface conditions, the road surface friction coefficient of each road surface condition may be weighted in accordance with the count value, and the road surface friction coefficient in front of the vehicle 100 may be determined based on the weighted road surface friction coefficients. This helps to estimate the road surface friction coefficient that is robust against a disturbance even when noise is included in the detection signal of the sensor compared with a case where the road surface friction coefficient is estimated directly from the sensor data.

In some embodiments, as a result of the majority decision, when the count value is greater than or equal to the threshold in two or more road surface conditions out of the multiple road surface conditions, the road surface friction coefficient in front of the vehicle 100 may be determined based on the road surface friction coefficients of two or more road surface conditions in which the count value is greater than or equal to the threshold. This helps to estimate the road surface friction coefficient that is robust against a disturbance even when noise is included in the detection signal of the sensor compared with a case where the road surface friction coefficient is estimated directly from the sensor data.

In some embodiments, the majority decision is made by determining to which of the road surface conditions the road surface condition in front of the vehicle 100 corresponds, based on the sensor data, and incrementing the count value corresponding to the determined road surface condition. This helps to estimate the road surface friction coefficient that is robust against a disturbance even when noise is included in the detection signal of the sensor compared with a case where the road surface friction coefficient is estimated directly from the sensor data.

In some embodiments, the road surface friction coefficient corresponding to the road surface condition determined by the majority decision may be read from the data set 21 in the memory 20, and the road surface friction coefficient in front of the vehicle 100 may be determined based on the read road surface friction coefficient. This helps to estimate the road surface friction coefficient that is robust against a disturbance even when noise is included in the detection signal of the sensor compared with a case where the road surface friction coefficient is estimated directly from the sensor data.

In some embodiments, the n pieces of sensor data may be periodically acquired from the sensor 10 of the own vehicle (the vehicle 100). This helps to estimate the road surface friction coefficient in real time. Further, this helps to estimate the road surface friction coefficient without being affected by a communication environment compared with a case of acquiring n pieces of sensor data from the outside.

Although some example embodiments have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

In the data set 21 of the above-described example embodiment, for example, one value may be specified as the road surface friction coefficient for each road surface condition as illustrated in FIG. 4A. Further, in the data set 21 of the above-described example embodiment, for example, two values may be specified as the road surface friction coefficient for each road surface condition as illustrated in FIG. 4B. Further, in the data set 21 of the above-described example embodiment, for example, a mathematical function having a predetermined physical quantity as a parameter (X) may be specified as the road surface friction coefficient for each road surface condition as illustrated in FIG. 4C. Examples of the parameter (X) may include data obtainable from the sensor 10 (for example, a water film thickness). In this case also, as in the above-described example embodiment, it is possible to help estimate the road surface friction coefficient that is robust against a disturbance compared with a case where the road surface friction coefficient is estimated directly from the sensor data.

In the above-described example embodiment and the modification example thereof, the control unit 50 may determine the road surface condition in front of the vehicle 100 by making a majority decision on the road surface conditions, based on the n pieces of sensor data (for example, the n pieces of received light data) obtained from the sensor 10 of the own vehicle (the vehicle 100). However, in the above-described example embodiment and modification example A, the control unit 50 may acquire n pieces of sensor data (for example, n pieces of received light data) obtained from the sensor 10 of the other vehicle (the vehicle 100) traveling in front of the own vehicle (the vehicle 100) through the vehicle-to-vehicle communicator 40. In this case, the vehicle-to-vehicle communicator 40 may include, for example, a receiver configured to periodically receive the n pieces of sensor data acquired by the sensor (a device corresponding to the sensor 10) of the other vehicle (the vehicle 100) traveling in front. In this case, the control unit 50 may calculate the road surface friction coefficient by executing a procedure illustrated in FIG. 5, for example.

Figure 5:
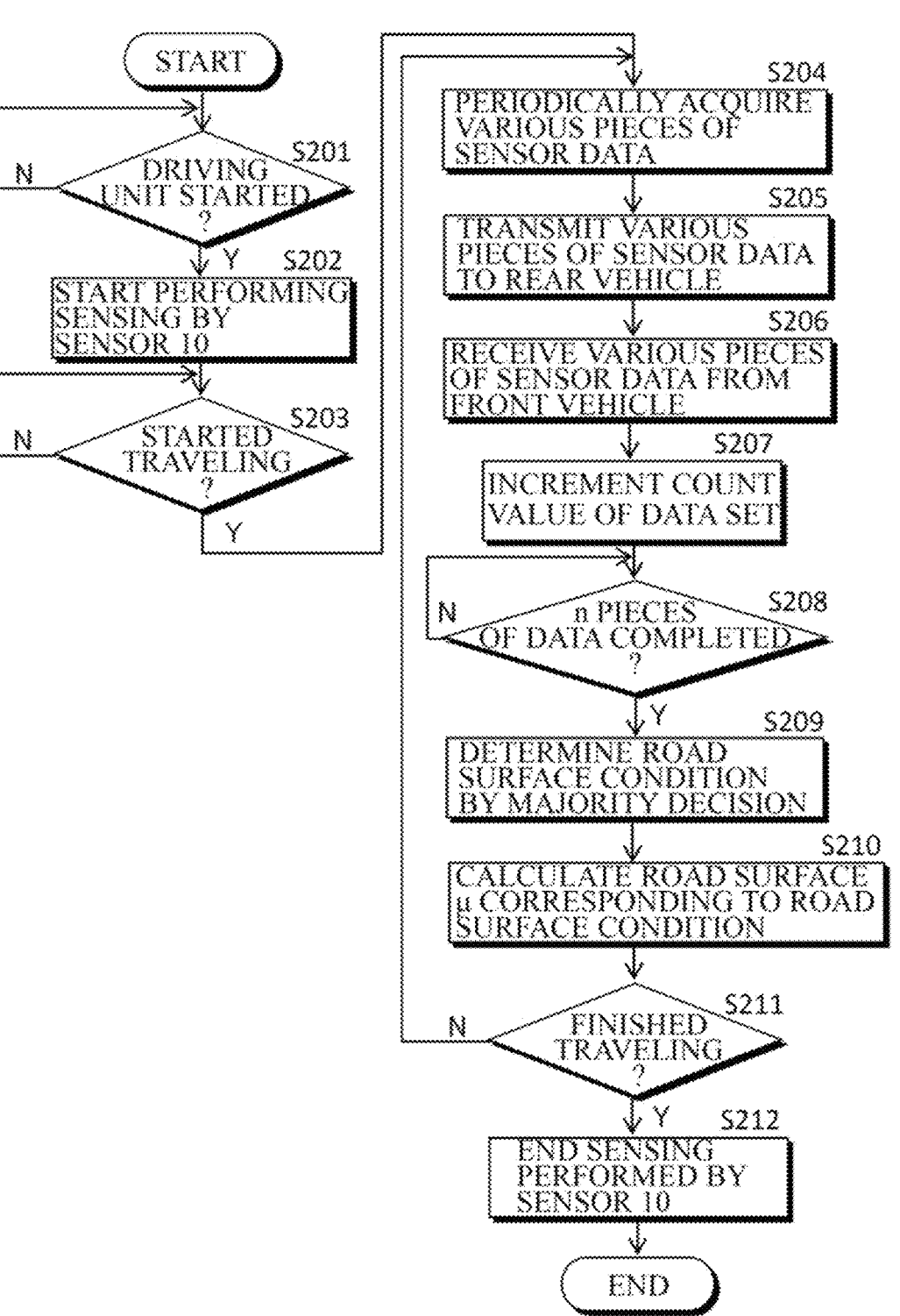
FIG. 5 is a flowchart for describing a modification example of the road surface friction coefficient calculation procedure performed in the vehicle of FIG. 1.

FIG. 5 illustrates an example of a road surface friction coefficient calculation procedure performed in the vehicle 100 according to modification example B.

First, the control unit 50 may determine whether the driving unit 60 has been started (step S201). As a result, when it is determined that the driving unit 60 has been started (step S201; Y), the control unit 50 may start performing sensing by the sensor 10 (step S202). The control unit 50 may determine whether the own vehicle (the vehicle 100) has started traveling (step S203). As a result, when it is determined that the own vehicle (the vehicle 100) has started traveling (step S203; Y), the control unit 50 may periodically acquire various pieces of sensor data from the sensor 10 (step S204).

The control unit 50 may transmit the acquired various pieces of sensor data to a rear vehicle (the vehicle 100) through the vehicle-to-vehicle communicator 40 (step S205). The control unit 50 may acquire the n pieces of sensor data (for example, the n pieces of received light data) obtained by the sensor 10 of the other vehicle (the vehicle 100) traveling in front of the own vehicle (the vehicle 100) through the vehicle-to-vehicle communicator 40 (step S206).

The control unit 50 may determine to which of the road surface conditions the road surface condition in front of the vehicle 100 corresponds, based on the sensor data (for example, the received light data) acquired from the other vehicle (the vehicle 100), and increment the count value corresponding to the determined road surface condition (step S207). The control unit 50 may perform the above process for all the n pieces of sensor data (for example, the n pieces of received light data). When the processes for the n pieces of sensor data (for example, the n pieces of received light data) are completed (step S208; Y), the control unit 50 may make a majority decision using the thresholds, and thereby determine the road surface condition (step S209).

As a result of the majority decision, when the count value is greater than or equal to the threshold in any of the road surface conditions, the control unit 50 may set the road surface condition in which the count value is greater than or equal to the threshold as the road surface condition in front of the vehicle 100. Note that, as a result of the majority decision, when the count value is not greater than or equal to the threshold in any of the road surface conditions, the control unit 50 may consider that the road surface condition having the smallest road surface friction coefficient out of the road surface conditions as the road surface condition in front of the vehicle 100.

When the count value is not greater than or equal to the threshold in any of the road surface conditions as a result of the majority decision, the control unit 50 may cause the process to shift to step S210 without immediately determining the road surface condition. When the count value is greater than or equal to the threshold in two or more road surface conditions out of the multiple road surface conditions as a result of the majority decision, the control unit 50 may cause the process to shift to step S210 without immediately determining the road surface condition.

The control unit 50 may read, from the memory 20, the road surface friction coefficient (for example, the road surface friction coefficient range) corresponding to the road surface condition determined by the majority decision. The control unit 50 may determine the road surface friction coefficient in front of the vehicle 100, based on the read road surface friction coefficient (for example, the read road surface friction coefficient range) (step S210). For example, when one road surface condition is selected as a result of the majority decision, the control unit 50 may determine the road surface friction coefficient in front of the vehicle 100, based on the road surface friction coefficient (for example, the road surface friction coefficient range) corresponding to the selected road surface condition. For example, when one road surface condition is selected as a result of the majority decision, the control unit 50 may set a median of the road surface friction coefficient corresponding to the selected road surface condition as the road surface friction coefficient in front of the vehicle 100.

The control unit 50 may perform, for example, the following process when the count value is not greater than or equal to the threshold in any of the road surface conditions as a result of the majority decision. The control unit 50 may determine the road surface friction coefficient in front of the vehicle 100, based on, for example, the road surface friction coefficient (for example, the road surface friction coefficient range) corresponding to the road surface condition having the smallest road surface friction coefficient out of the road surface conditions. The control unit 50 may, for example, perform weighting of the road surface friction coefficient (for example, the road surface friction coefficient range) of each road surface condition in accordance with the count value. The control unit 50 may determine the road surface friction coefficient in front of the vehicle 100, based on the weighted road surface friction coefficient (for example, the weighted road surface friction coefficient range). The control unit 50 may, for example, perform weighting (DRY<WET<SNOW<ICE) of the road surface friction coefficient (for example, the road surface friction coefficient range) of each road surface condition in accordance with the magnitude of the road surface friction coefficient (for example, the road surface friction coefficient range). The control unit 50 may determine the road surface friction coefficient in front of the vehicle 100, based on the weighted road surface friction coefficient (for example, the weighted road surface friction coefficient range).

The control unit 50 may perform, for example, the following process when the count value is greater than or equal to the threshold in two or more road surface conditions out of the multiple road surface conditions as a result of the majority decision. The control unit 50 may determine the road surface friction coefficient in front of the vehicle 100, based on, for example, the road surface friction coefficients (for example, the road surface friction coefficient ranges) of two or more road surface conditions in which the count value is greater than or equal to the threshold. The control unit 50 may, for example, perform weighting of the road surface friction coefficient (for example, the road surface friction coefficient range) of each road surface condition in which the count value is greater than or equal to the threshold in accordance with the count value. The control unit 50 may determine the road surface friction coefficient in front of the vehicle 100, based on the weighted road surface friction coefficient (for example, the weighted road surface friction coefficient range). For example, the control unit 50 may set, as the road surface friction coefficient in front of the vehicle 100, a median of medians of the road surface friction coefficient ranges of the road surface conditions in which the count value is greater than or equal to the threshold.

The control unit 50 may determine whether the own vehicle (the vehicle 100) has finished traveling (step S211). As a result, when it is determined that the own vehicle (the vehicle 100) has finished traveling (step S211; Y), the control unit 50 may end the sensing performed by the sensor 10 (step S212). In this way, calculation of the road surface friction coefficient may be performed in the vehicle 100.

In modification example B, the n pieces of sensor data may be periodically acquired from the sensor 10 of the front vehicle (the vehicle 100). This helps to estimate the road surface friction coefficient that is robust against a disturbance even when noise is included in the detection signal of the sensor compared with a case where the road surface friction coefficient is estimated directly from the sensor data.

In the above-described example embodiment and the modification examples thereof, the control unit 50 may change the value of one or more of the multiple thresholds set for the multiple road surface conditions in accordance with a mode set in the mode inputting unit 30. In this case, for example, in the rainy weather traveling mode and the snow road traveling mode, it is possible to set the threshold to a value that suppresses induction of slipping. Further, for example, in the sport traveling mode, it is possible to prevent the driver from feeling an insufficiency in acceleration.

In the above-described example embodiment and the modification examples thereof, the control unit 50 may set the number of pieces of sensor data used for the majority decision to a smaller number as the vehicle speed increases. When the vehicle speed is high, a traveling distance used to acquire the n pieces of sensor data may also be increased. Setting the number of pieces of sensor data used for the majority decision to a smaller number as the vehicle speed increases makes it possible to set the traveling distance used to acquire the n pieces of sensor data to an appropriate length. This helps to estimate the road surface friction coefficient that is robust against a disturbance even when the vehicle speed is high.

The example effects described herein are mere examples, and example effects of the disclosure are therefore not limited to those described herein. Accordingly, the disclosure may achieve any other example effect.

Furthermore, the disclosure may encompass at least the following embodiments.

(1) A road surface friction coefficient calculation apparatus to be applied to a vehicle, the road surface friction coefficient calculation apparatus including:

an obtainer configured to acquire n pieces of sensor data periodically obtained by a predetermined sensor during a predetermined period; and a determiner configured to determine a road surface condition in front of the vehicle by making a majority decision on multiple road surface conditions, based on the n pieces of sensor data acquired by the obtainer, in which the determiner is configured to set a different road surface friction coefficient for each of the road surface conditions, and determine a road surface friction coefficient in front of the vehicle, based on the road surface friction coefficient corresponding to the road surface condition determined by the majority decision.

(2) The road surface friction coefficient calculation apparatus according to (1), in which the determiner is configured to set a range for each of the road surface conditions as the road surface friction coefficient, and determine the road surface friction coefficient in front of the vehicle, based on the range of the road surface friction coefficient corresponding to the road surface condition determined by the majority decision.

(3) The road surface friction coefficient calculation apparatus according to (1), in which the determiner is configured to set a mathematical function for each of the road surface conditions as the road surface friction coefficient, and determine the road surface friction coefficient in front of the vehicle, based on the mathematical function of the road surface friction coefficient corresponding to the road surface condition determined by the majority decision.

(4) The road surface friction coefficient calculation apparatus according to (1), in which the determiner is configured to set one or more values for each of the road surface conditions as the road surface friction coefficient, and determine the road surface friction coefficient in front of the vehicle, based on the one or more values of the road surface friction coefficient corresponding to the road surface condition determined by the majority decision.

(5) The road surface friction coefficient calculation apparatus according to any one of (1) to (4), in which the determiner is configured to set the road surface friction coefficient and a threshold for each of the road surface conditions, set each of the thresholds to a relatively small value as the corresponding road surface friction coefficient becomes relatively small, and make the majority decision using the thresholds as determination criteria.

(6) The road surface friction coefficient calculation apparatus according to any one of (1) to (5), in which the determiner is configured to set the number of pieces n of the sensor data used for the majority decision to a smaller number as a speed of the vehicle increases.

(7) The road surface friction coefficient calculation apparatus according to any one of (1) to (5), in which the determiner is configured to change one or more of the thresholds set for the road surface conditions in accordance with a set mode.

(8) The road surface friction coefficient calculation apparatus according to any one of (1) to (5), in which, as a result of the majority decision, when a count value of number of pieces of the sensor data is not greater than or equal to the threshold in any of the road surface conditions, the determiner is configured to determine the road surface friction coefficient in front of the vehicle, based on the road surface friction coefficient corresponding to the road surface condition having a smallest road surface friction coefficient out of the road surface conditions.

(9) The road surface friction coefficient calculation apparatus according to any one of (1) to (5), in which, as a result of the majority decision, when a count value of number of pieces of the sensor data is not greater than or equal to the threshold in any of the road surface conditions, the determiner is configured to perform weighting of the road surface friction coefficient of each of the road surface conditions in accordance with the count value, and determine the road surface friction coefficient in front of the vehicle, based on the weighted road surface friction coefficient.

(10) The road surface friction coefficient calculation apparatus according to any one of (1) to (5), in which, as a result of the majority decision, when a count value of number of pieces of the sensor data is greater than or equal to the threshold in two or more of the road surface conditions out of the multiple road surface conditions, the determiner is configured to determine the road surface friction coefficient in front of the vehicle, based on the road surface friction coefficients of the two or more road surface conditions in which the count value is greater than or equal to the threshold.

(11) The road surface friction coefficient calculation apparatus according to any one of (8) to (10), in which the determiner is configured to make the majority decision by determining to which of the road surface conditions the road surface condition in front of the vehicle corresponds, based on the sensor data, and incrementing the count value corresponding to the determined road surface condition.

(12) The road surface friction coefficient calculation apparatus according to any one of (1) to (11), further including a memory configured to store a data set in which the road surface friction coefficient is associated with each of the road surface conditions, in which the determiner is configured to read, from the memory, the road surface friction coefficient corresponding to the road surface condition determined by the majority decision, and determine the road surface friction coefficient in front of the vehicle, based on the read road surface friction coefficient.

(13) A vehicle including a control processor configured to control operation of the vehicle, in which the control processor includes:

an obtainer configured to acquire n pieces of sensor data periodically obtained by a predetermined sensor during a predetermined period; and a determiner configured to determine a road surface condition in front of the vehicle by making a majority decision on multiple road surface conditions, based on the n pieces of sensor data acquired by the obtainer, and the determiner is configured to set a different road surface friction coefficient for each of the road surface conditions, and determine a road surface friction coefficient in front of the vehicle, based on the road surface friction coefficient corresponding to the road surface condition determined by the majority decision.

(14) The vehicle according to (13), further including the sensor configured to periodically acquire the n pieces of sensor data, in which the sensor includes a non-contact sensor.

(15) The vehicle according to (13), further including a communicator configured to periodically acquire the n pieces of sensor data from a front vehicle.

(16) A road surface friction coefficient calculation method including:

setting a different road surface friction coefficient for each of multiple road surface conditions;

making a majority decision on the road surface conditions, based on n pieces of sensor data periodically obtained by a predetermined sensor during a predetermined period; and determining a road surface friction coefficient in front of a vehicle, based on the road surface friction coefficient corresponding to the road surface condition determined by the majority decision.

Each of the travel control processor 51, the road surface condition determiner 52, and the road surface μ determiner 53 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the travel control processor 51, the road surface condition determiner 52, and the road surface μ determiner 53. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the travel control processor 51, the road surface condition determiner 52, and the road surface μ determiner 53 illustrated in FIG. 1.

The invention claimed is:

1. A road surface friction coefficient calculation apparatus to be applied to a vehicle, the road surface friction coefficient calculation apparatus comprising:

one or more processors; and one or more memories storing a data set comprising a plurality of road surface conditions, each road surface condition is associated with (i) a road surface friction coefficient, (ii) a threshold, and (iii) a count value, the one or more memories further storing instructions that, when executed by the one or more processors, cause the one or more processors to:

in response to determining that (i) a driving unit of the vehicle has been started and (ii) the vehicle has started traveling, receive n pieces of sensor data from a predetermined sensor, wherein n is a predetermined integer value that is equal to or greater than 2, and wherein each of the n pieces of sensor data is obtained by the predetermined sensor at different timings;

each time the n pieces of sensor data are received, repeatedly execute a calculation process including:

assigning each of the n pieces of sensor data to one of the plurality of road surface conditions based on a numerical value indicated by the sensor data, and then incrementing the count value associated with the one of the plurality of road surface conditions;

in response to a completion of the assignment for all of the n pieces of sensor data, determining, for each of the plurality of road surface conditions, whether the count value is greater than or equal to the threshold;

when the count value is greater than or equal to the threshold in one road surface condition among the plurality of road surface conditions, determining a road surface friction coefficient in front of the vehicle based on the road surface friction coefficient associated with the one road surface condition in which the count value is greater than or equal to the threshold; and when the count value is greater than or equal to the threshold in two or more road surface conditions among the plurality of road surface conditions, determining the road surface friction coefficient in front of the vehicle based on the road surface friction coefficient associated with each of the two or more road surface conditions in which the count value is greater than or equal to the threshold; and control a torque of the driving unit of the vehicle based on the determined road surface friction coefficient.

2. The road surface friction coefficient calculation apparatus according to claim 1, wherein the one or more processors are configured to set a range for each of the plurality of road surface conditions as the road surface friction coefficient, and determine the road surface friction coefficient in front of the vehicle, based on the range of the road surface friction coefficient corresponding to the road surface condition.

3. The road surface friction coefficient calculation apparatus according to claim 1, wherein the one or more processors are configured to set a mathematical function for each of the plurality of road surface conditions as the road surface friction coefficient, and determine the road surface friction coefficient in front of the vehicle, based on the mathematical function of the road surface friction coefficient corresponding to the road surface condition.

4. The road surface friction coefficient calculation apparatus according to claim 1, wherein the one or more processors are configured to set one or more values for each of the plurality of road surface conditions as the road surface friction coefficient, and determine the road surface friction coefficient in front of the vehicle, based on the one or more values of the road surface friction coefficient corresponding to the road surface condition.

5. The road surface friction coefficient calculation apparatus according to claim 1, wherein the one or more processors are configured to set each of the thresholds to a smaller value as the corresponding road surface friction coefficient becomes smaller.

6. The road surface friction coefficient calculation apparatus according to claim 5, wherein the one or more processors are configured to change one or more of the thresholds set for the plurality of road surface conditions in accordance with a set mode.

7. The road surface friction coefficient calculation apparatus according to claim 5, wherein, when the count value is not greater than or equal to the threshold in any of the plurality of road surface conditions, the one or more processors are configured to determine the road surface friction coefficient in front of the vehicle, based on the road surface friction coefficient corresponding to the road surface condition having a smallest road surface friction coefficient among the plurality of road surface conditions.

8. The road surface friction coefficient calculation apparatus according to claim 5, wherein, when the count value is not greater than or equal to the threshold in any of the plurality of road surface conditions, the one or more processors are configured to perform weighting of the road surface friction coefficient of each of the plurality of road surface conditions in accordance with the count value, and determine the road surface friction coefficient in front of the vehicle, based on the weighted road surface friction coefficient.

9. The road surface friction coefficient calculation apparatus according to claim 1, wherein the one or more processors are configured to set a number of pieces n of the sensor data to a smaller number as a speed of the vehicle increases.

10. The road surface friction coefficient calculation apparatus according to claim 1, wherein the predetermined sensor comprises a light-receiving sensor configured to emit near-infrared light toward a road surface in front of the vehicle and receive reflected light therefrom.

11. The road surface friction coefficient calculation apparatus according to claim 1, wherein the plurality of road surface conditions include DRY, WET, SNOW, and ICE conditions.

12. A road surface friction coefficient calculation method comprising:

storing a data set comprising a plurality of road surface conditions, each road surface condition is associated with (i) a road surface friction coefficient, (ii) a threshold, and (iii) a count value;

in response to determining that (i) a driving unit of a vehicle has been started and (ii) the vehicle has started traveling, receive n pieces of sensor data from a predetermined sensor, wherein n is a predetermined integer value that is equal to or greater than 2, and wherein each of the n pieces of sensor data is obtained by the predetermined sensor at different timings;

each time the n pieces of sensor data are received, repeatedly execute a calculation process including:

assigning each of the n pieces of sensor data to one of the plurality of road surface conditions based on a numerical value indicated by the sensor data, and then incrementing the count value associated with the one of the plurality of road surface conditions;

in response to a completion of the assignment for all of the n pieces of sensor data, determining, for each of the plurality of road surface conditions, whether the count value is greater than or equal to the threshold;

based on the count value is greater than or equal to the threshold in one road surface condition among the plurality of road surface conditions, determining a road surface friction coefficient in front of the vehicle based on the road surface friction coefficient associated with the one road surface condition in which the count value is greater than or equal to the threshold; and based on the count value is greater than or equal to the threshold in two or more road surface conditions among the plurality of road surface conditions, determining the road surface friction coefficient in front of the vehicle based on the road surface friction coefficient associated with each of the two or more road surface conditions in which the count value is greater than or equal to the threshold; and control a torque of the driving unit of the vehicle based on the determined road surface friction coefficient.

13. A road surface friction coefficient calculation apparatus to be applied to a vehicle, the road surface friction coefficient calculation apparatus comprising circuitry configured to:

store a data set comprising a plurality of road surface conditions, each road surface condition is associated with (i) a road surface friction coefficient, (ii) a threshold, and (iii) a count value;

in response to determining that (i) a driving unit of the vehicle has been started and (ii) the vehicle has started traveling, receive n pieces of sensor data from a predetermined sensor, wherein n is a predetermined integer value that is equal to or greater than 2, and wherein each of the n pieces of sensor data is obtained by the predetermined sensor at different timings;

each time the n pieces of sensor data are received, repeatedly execute a calculation process including:

assigning each of the n pieces of sensor data to one of the plurality of road surface conditions based on a numerical value indicated by the sensor data, and then incrementing the count value associated with the one of the plurality of road surface conditions;

in response to a completion of the assignment for all of the n pieces of sensor data, determining, for each of the plurality of road surface conditions, whether the count value is greater than or equal to the threshold;

when the count value is greater than or equal to the threshold in one road surface condition among the plurality of road surface conditions, determining a road surface friction coefficient in front of the vehicle based on the road surface friction coefficient associated with the one road surface condition in which the count value is greater than or equal to the threshold; and when the count value is greater than or equal to the threshold in two or more road surface conditions among the plurality of road surface conditions, determining the road surface friction coefficient in front of the vehicle based on the road surface friction coefficient associated with each of the two or more road surface conditions in which the count value is greater than or equal to the threshold; and control a torque of the driving unit of the vehicle based on the determined road surface friction coefficient.

14. The road surface friction coefficient calculation apparatus according to claim 13, wherein the predetermined sensor comprises a light-receiving sensor configured to emit near-infrared light toward a road surface in front of the vehicle and receive reflected light therefrom.

15. The road surface friction coefficient calculation apparatus according to claim 13, wherein the plurality of road surface conditions include DRY, WET, SNOW, and ICE conditions.

* * * * *